Aug. 20, 1957 W. J. STADER 2,803,475
AUTOMATIC SANDING DEVICE FOR VEHICLES
Filed Feb. 24, 1956 2 Sheets-Sheet 1

William J. Stader
INVENTOR.

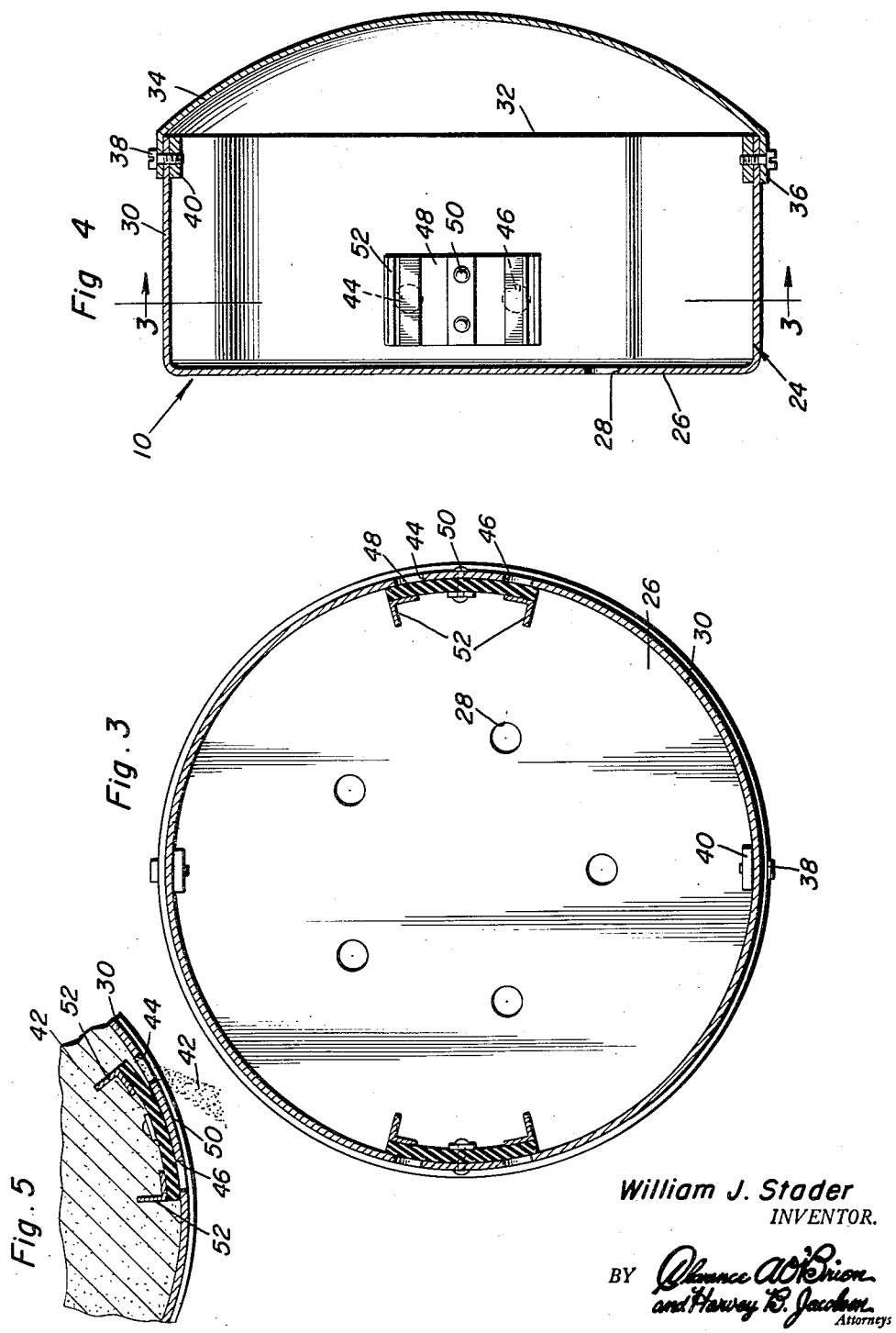

United States Patent Office 2,803,475
Patented Aug. 20, 1957

2,803,475

AUTOMATIC SANDING DEVICE FOR VEHICLES

William J. Stader, Perkasie, Pa.

Application February 24, 1956, Serial No. 567,562

6 Claims. (Cl. 291—32)

This invention generally relates to a sanding device and more specifically provides a device for attachment to an automobile or similar type vehicle for automatically sprinkling sand adjacent to and under the driving wheels when the driving wheels begin spinning such as normally occurs when these wheels are on ice, snow or other low traction surfaces.

In the operation of vehicles such as automobiles wherein a pair of driving wheels are employed for engagement with a surface wherein rotation of the driving wheels causes the vehicle to move in the desired direction, it sometimes occurs that the supporting surface is covered with ice, snow or other material thereby reducing the frictional contact between the tire or the driving wheel and the supporting surface, thereby causing the driving wheel to spin without moving the vehicle longitudinally. Normally, the addition of sand is only necessary until such time as the vehicle has been set into motion unless the vehicle is moving up a steep incline or actually stuck in snow. There have been provided sanding devices, the simplest of which includes a discharge spout having a control valve operable from the dash wherein manual operation of the control valve will permit discharge of the sand in the desired position. However, such manually actuated sanding devices are limited in their utility and necessarily depend upon manual actuation which is slow and which discharges sand unnecessarily and also discharges sand at the wrong time. Accordingly, it is the primary object of the present invention to provide a sanding device which may be attached to any existing driving wheel or which may be fastened to a driving wheel that is automatic in operation so that when the wheel breaks traction or spins, sand will automatically be discharged for increasing the traction thereof and when the wheel regains traction and ceases spinning, the sanding device will automatically stop discharging sand thereby rendering an efficient sanding device which will be actuated automatically at the correct time for most effective increase of the traction power of the driving wheels of a vehicle.

Another important object of the present invention is to provide a sanding device which is attached to the outside surface of a wheel but which will spray sand by centrifugal force from diametrical opposed points for disposition in the area of the line of traction of the driving wheel.

Other objects of the present invention will reside in its simplicity of construction, pleasing appearance, adaptation for various types of vehicles, effectiveness for its particular purposes and its relatively inexpensive manufacturing cost.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 3 is a vertical sectional view taken substantially upon a plane passing along section line 3—3 of Figure 4 illustrating the structural details of the interior of the sanding device;

Figure 4 is a transverse, vertical sectional view illustrating the manner of attaching the closure cover and the relationship of the flap valves to the discharge apertures; and Figure 5 is a detailed view illustrating one of the flap valves in partially opened position and illustrating the sand being discharged therethrough.

Figure 1:
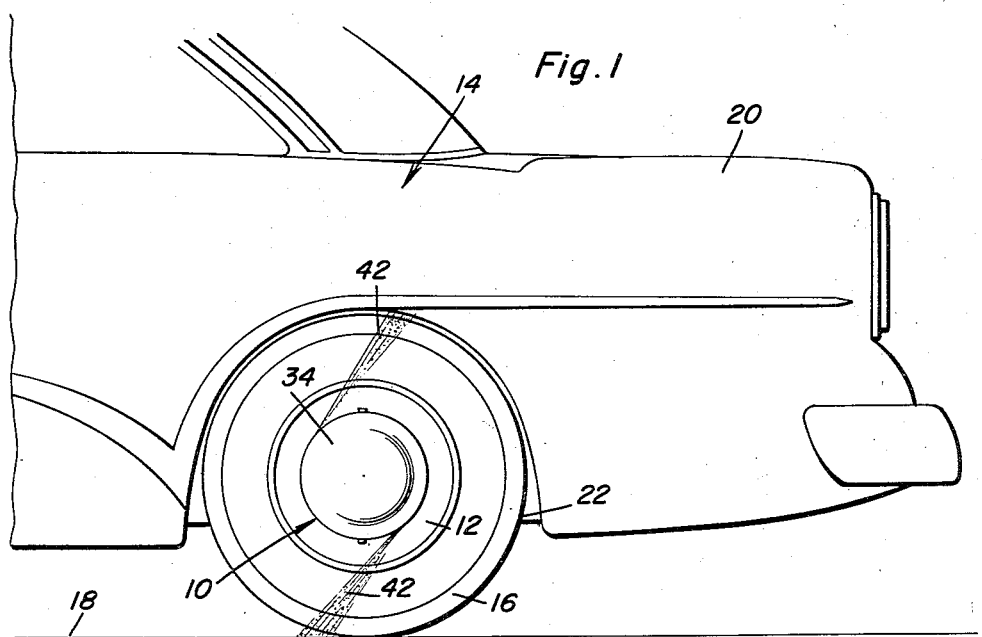
Figure 1 is a side elevational view of the rear portion of a vehicle illustrating the driving wheel with the sanding device of the present invention installed thereon.
Figure 2:
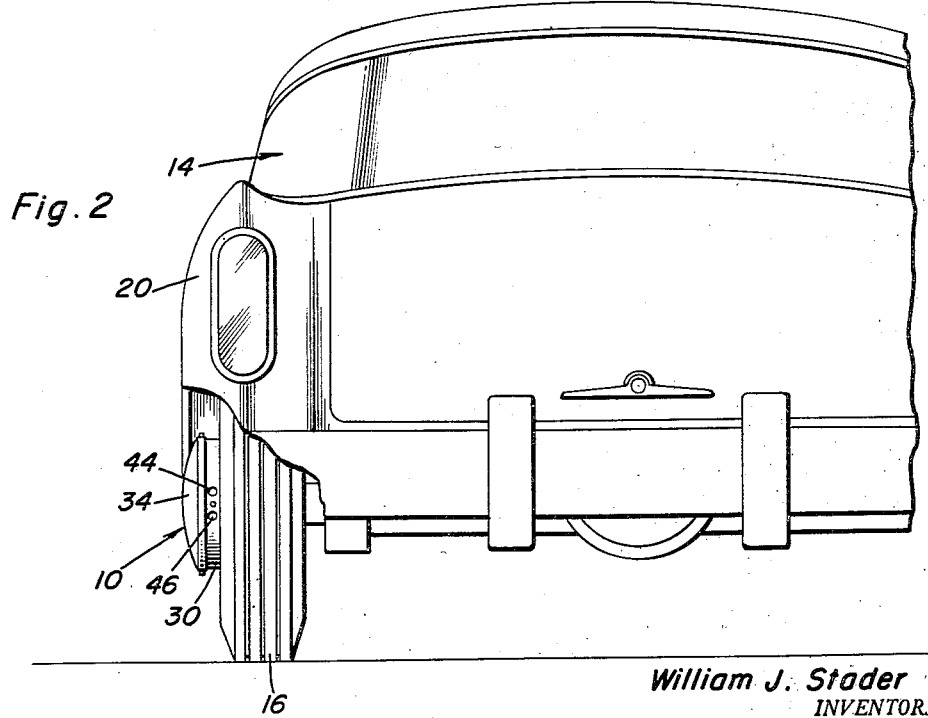
Figure 2 is an end view of the construction of Figure 1 with portions of the vehicle being broken away illustrating the relationship of the sanding device to the driving wheel.

Referring now specifically to the drawings, the numeral 10 generally designates the sanding device of the present invention which is specifically illustrated mounted on the rear wheel 12 of a passenger automobile generally designed by the numeral 14. The wheel 12 includes the usual pneumatic tire 16 which engages a supporting surface such as a street or the ground surface 18 for driving the automobile 14 in the desired direction when the driving wheel 12 is rotated in a manner well known. The automobile 14 includes a fender 20 having an opening 22 therein for receiving the wheel 12 and tire 16 in the usual manner.

The sanding device 10 includes a cylindrical receptacle generally designated by the numeral 24 and including a flat circular side wall 26 having a plurality of openings 28 therein which are arranged for positioning over the lug bolts of the automobile 14 wherein the lug nuts will hold the receptacle 14 centrally on the wheel 12 thereby mounting the receptacle 24 in operative position.

Integrally formed with the side wall 26 is a cylindrical peripheral wall 30 having an open outer end 32 which is closed by a generally dome-shaped closure member 34 that is provided with a peripheral flange 36 telescoping over the cylindrical peripheral wall 30. A plurality of screw threaded fasteners 38 extend through the flange 36 and the peripheral wall 30 and engage internally threaded nuts 40 on the inner surface of the peripheral wall 30 thereby detachably securing the closure 34 to the receptacle 24. The dome-shaped closure 34 generally simulates the appearance of a hub cap which is normally employed on the wheel 12 thereby retaining the sanding device of the present invention attractive in appearance.

A quantity of sand 42 may be disposed within the receptacle 24 and a plurality of pairs of discharge apertures 44 and 46 are provided in the cylindrical peripheral wall 30 for discharging the sand 42 radially from the receptacle 24 for disposition in the path of movement of the traction tire 16.

A flap valve 48 is provided in overlying relation to each pair of apertures 44 and 46 and is secured at the center thereof by fastening members 50. The flap valve 48 is provided with free ends adjacent the outer edges of the apertures 44 and 46 and a right angular member 52 is attached to the inner surface of the flap valve 48 adjacent each free end thereof and forms a radially extending tab on each end of the flap valve 48 wherein pressure on the right angular tabs 52 towards the center of the flap valve 48 will cause the flap valve 48 to bend inwardly substantially in the manner illustrated in Figure 5 to permit sand 42 to be discharged through one of the apertures 44 or 46 wherein the sand 42 will be moved radially by centrifugal force for spreading on the ground 18. This sand will either be thrown upwardly or downwardly since the pairs of apertures are arranged in diametrically opposed relation and the sand hitting the fender well 22 will fall downwardly and be employed for increasing the traction between the wheel and tire and the ground surface 18.

The sand 42 will automatically raise the flap valve 48 away from the apertures 44 and 46 when the wheel 12 is spinning due to the sudden acceleration of the wheel 12 in either rotational direction. The sand, being a granular material, will tend to remain stationary and when power is applied to the wheels 12 and the wheel 12 begins to spin as occurs when no traction occurs, the cylindrical wall 30 will move rapidly and the sand 42 will remain stationary temporarily wherein the sand 42 will engage the abutment tab 52 and raise the flap valve 48 away from the aperture 44 as illustrated in Figure 5. This action will permit discharge of the sand for its use for increasing the traction of the vehicle wheel and tire. After the wheel and tire have gained traction and the sand 42 rotates with the cylindrical wall 30, the flap valve 48 will be closed and centrifugal force will evenly distribute the sand about the peripheral wall 30 thereby eliminating any unbalanced condition which may be caused by the sand.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A sanding device for attachment to a driving wheel of a vehicle comprising a generally cylindrical receptacle adapted to be attached to the driving wheel for rotation therewith, a removable closure for a portion of said receptacle to permit sand to be disposed therein, the periphery of said receptacle having an aperture, a flexible flap resiliently biased into overlying relation to the aperture against the inner surface of the receptacle, and an inwardly projecting tab on the free end of the flap whereby relative movement between the sand and the receptacle will open the flap during rapid acceleration of the wheel when the wheel loses traction and spins thereby discharging sand adjacent the periphery of the wheel for increasing the traction thereof.

2. A sanding device for attachment to a driving wheel of a vehicle comprising a generally cylindrical receptacle adapted to be attached to the driving wheel for rotation therewith, a removable closure for a portion of said receptacle to permit sand to be disposed therein, the periphery of said receptacle having an aperture, a flexible flap resiliently biased into overlying relation to the aperture against the inner surface of the receptacle, and an inwardly projecting tab on the free end of the flap whereby relative movement between the sand and the receptacle will open the flap during rapid acceleration of the wheel when the wheel loses traction and spins thereby discharging sand adjacent the periphery of the wheel for increasing the traction thereof, said removable closure being dome-shaped and forming one side of the receptacle for simulating a hub cap.

3. A sanding device for attachment to a driving wheel of a vehicle comprising a generally cylindrical receptacle adapted to be attached to the driving wheel for rotation therewith, a removable closure for a portion of said receptacle to permit sand to be disposed therein, the periphery of said receptacle having an aperture, a flexible flap resiliently biased into overlying relation to the aperture against the inner surface of the receptacle, and an inwardly projecting tab on the free end of the flap whereby relative movement between the sand and the receptacle will open the flap during rapid acceleration of the wheel when the wheel loses traction and spins thereby discharging sand adjacent the periphery of the wheel for increasing the traction thereof, the inner side of said receptacle having a plurality of apertures arranged for positioning over the lug bolts whereby the lug nuts will retain the receptacle in position.

4. A sanding device for attachment to a driving wheel of a vehicle comprising a generally cylindrical receptacle adapted to be attached to the driving wheel for rotation therewith, a removable closure for a portion of said receptacle to permit sand to be disposed therein, the periphery of said receptacle having an aperture, a flexible flap resiliently biased into overlying relation to the aperture against the inner surface of the receptacle, and an inwardly projecting tab on the free end of the flap whereby relative movement between the sand and the receptacle will open the flap during rapid acceleration of the wheel when the wheel loses traction and spins thereby discharging sand adjacent the periphery of the wheel for increasing the traction thereof, said receptacle having a second aperture adjacent said aperture in the periphery thereof thereby forming a first pair of apertures, said receptacle having a second pair of apertures in diametric opposition to the first pair of apertures, said flap being an elongated rubber member having the center thereof attached to the receptacle between the pair of apertures, said tab extending radially inwardly from the free end of said rubber member, and an identical tab on the other end of said rubber member for discharging sand in either direction of rotation of the wheel.

5. A sanding device for attachment to a driving wheel of a vehicle comprising a generally cylindrical receptacle adapted to be attached to the driving wheel for rotation therewith, a removable closure for a portion of said receptacle to permit sand to be disposed therein, the periphery of said receptacle having an aperture, a flexible flap resiliently biased into overlying relation to the aperture against the inner surface of the receptacle, and an inwardly projecting tab on the free end of the flap whereby relative movement between the sand and the receptacle will open the flap during rapid acceleration of the wheel when the wheel loses traction and spins thereby discharging sand adjacent the periphery of the wheel for increasing the traction thereof, said removable closure being dome-shaped and forming one side of the receptacle for simulating a hub cap, the inner side of said receptacle having a plurality of apertures arranged for positioning over the lug bolts whereby the lug nuts will retain the receptacle in position, said receptacle having a second aperture adjacent said aperture in the periphery thereof thereby forming a first pair of apertures, said receptacle having a second pair of apertures in diametric opposition to the first pair of apertures, said flap being an elongated rubber member having the center thereof attached to the receptacle between the pair of apertures, said tab extending radially inwardly from the free end of said rubber member, and an identical tab on the other end of said rubber member for discharging sand in either direction of rotation of the wheel.

6. A sanding device for attachment to a traction wheel of a vehicle comprising a receptacle rotatable with the wheel, said receptacle having an opening for discharging sand, and a valve responsive to spinning of the wheel for discharging sand when the wheel breaks traction and spins.

No references cited.